United States Patent [19]

Kovatch et al.

[11] 4,295,053
[45] Oct. 13, 1981

[54] ELECTRIC CONTROL SYSTEM WITH MECHANICAL INTERLOCK

[75] Inventors: George N. Kovatch, Monroeville; James B. Wallace, Beaver, both of Pa.

[73] Assignee: Westinghouse Electric Corp., Pittsburgh, Pa.

[21] Appl. No.: 87,365

[22] Filed: Oct. 23, 1979

[51] Int. Cl.³ .............................................. H02J 9/06
[52] U.S. Cl. .................................. 307/64; 200/50 C; 307/80
[58] Field of Search .................... 200/50 C, DIG. 6; 307/64, 65, 23, 66, 67, 68, 80; 361/343

[56] References Cited

U.S. PATENT DOCUMENTS

| | | | |
|---|---|---|---|
| 2,573,485 | 10/1951 | Pifke | 200/50 C |
| 3,401,364 | 9/1968 | Whiting | 200/50 C |
| 3,710,288 | 1/1973 | Grunert | 335/160 |
| 3,736,538 | 5/1973 | Owen | 335/160 |
| 3,821,607 | 6/1974 | Matsko et al. | 200/293 X |
| 4,114,005 | 9/1978 | Maier et al. | 200/153 G |

Primary Examiner—J. V. Truhe
Assistant Examiner—Morris Ginsburg
Attorney, Agent, or Firm—L. P. Johns

[57] ABSTRACT

An electric control system with mechanical interlock characterized by means for switching between normal and emergency supply lines extending to a load which comprise two parallel paths extending to the load which paths include spaced controlled devices, and mechanical interlock means between the several control devices for preventing closing of two or more control devices at the same time.

7 Claims, 7 Drawing Figures

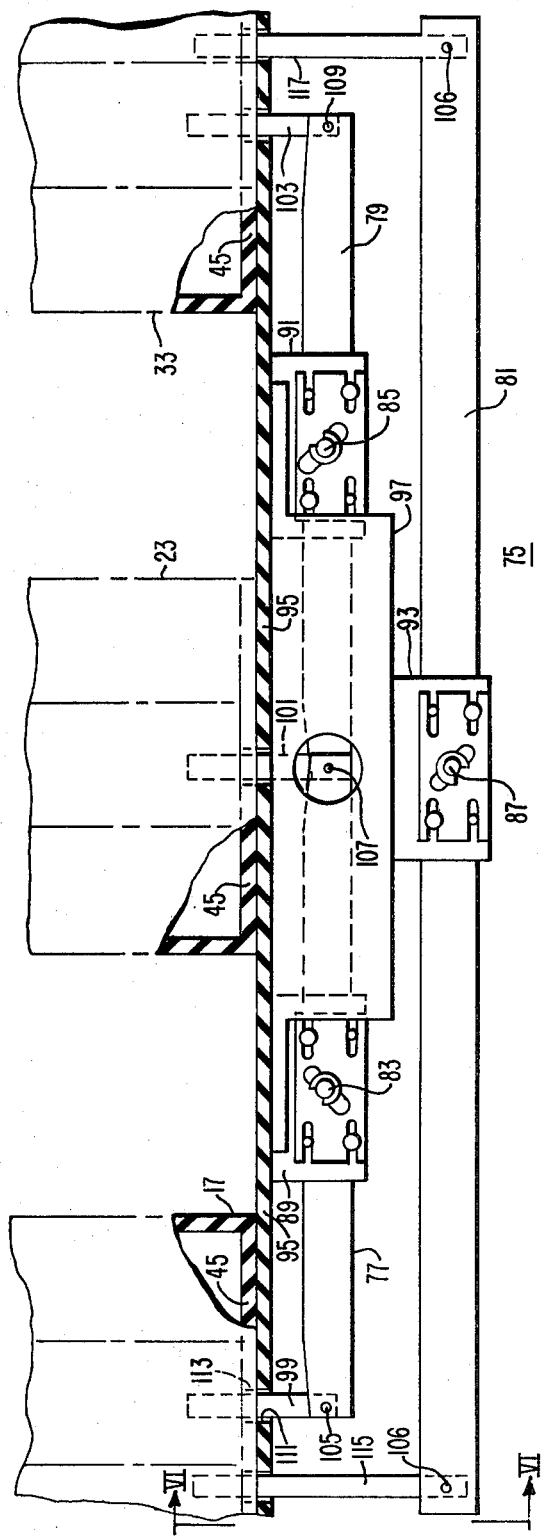

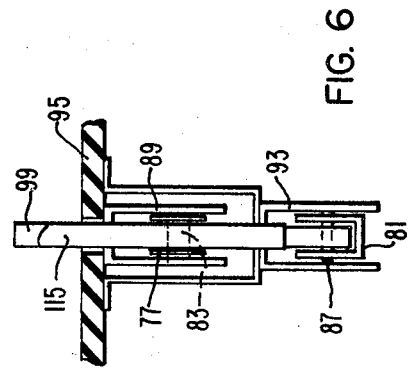
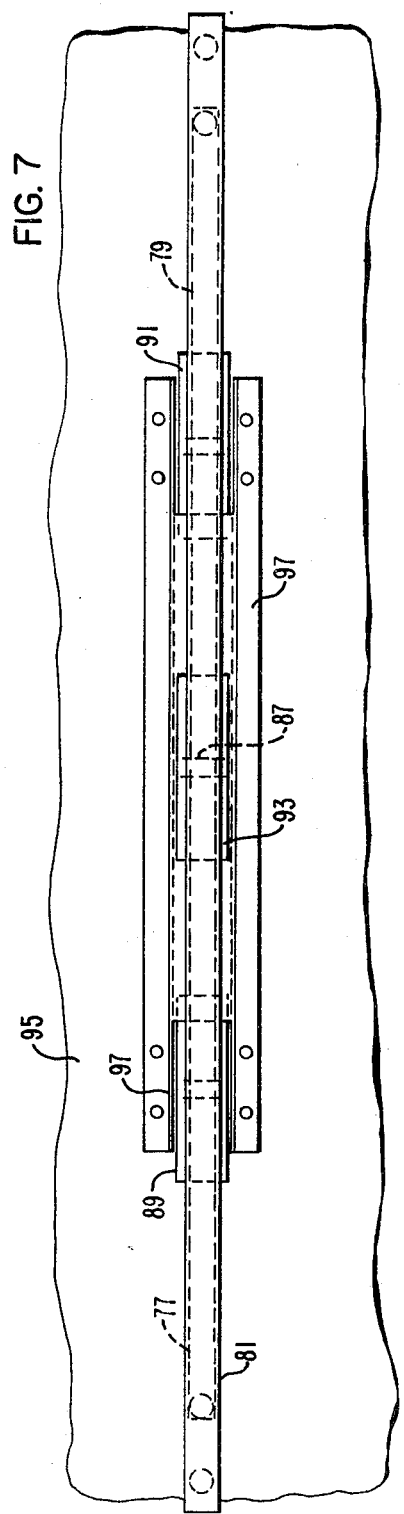

{ 4,295,053 }

ELECTRIC CONTROL SYSTEM WITH MECHANICAL INTERLOCK

CROSS-REFERENCE TO RELATED APPLICATIONS

This application is related to copending application Ser. No. 087,366 filed Oct. 23, 1979, to G. N. Kovatch, G. S. Bettencourt, and D. H. Soles.

BACKGROUND OF THE INVENTION

1. Field of the Invention

This invention relates to an electric control system with mechanical interlocks for preventing closing of two or more circuit breakers at the same time.

2. Description of the Prior Art

The control of electrical equipment, such as reversible and multispeed motors, usually includes a circuit interrupter for each motor operation. A typical circuit includes, for example, a separate manual button for each circuit interrupter for the forward and reverse directions of a motor. Moreover, actuation of a forward or reverse circuit includes an associated circuit for deactivating another of the forward and reverse circuits. Notwithstanding such precautions, it sometimes occurs due to inadvertence or other reasons that both circuits, i.e., forward and reverse control buttons are actuated simultaneously and thereby cause incorrect phase-to-phase line connections in the interrupters.

Associated with the foregoing is a problem with some circuit control systems where two supply lines are provided, such as, normal and emergency supply circuits. Where in addition a bypass circuit is provided to allow for maintenance of part of the control system it is particularly desirable to provide in addition mechanical interlocks for the safety of maintenance personnel.

SUMMARY OF THE INVENTION

In accordance with this invention, there is provided an electric control system comprising an isolation switching structure, a transfer switching structure, and a bypass switching structure; the isolation switching structure including first and second control devices, the transfer switching structure including third and fourth control devices, the bypass switching structure including fifth, sixth and seventh control devices, all of the control devices being operable between open and closed circuit conditions; one supply line including a first of two parallel paths extending to the load with one path including the first, third, and sixth control devices in series and with the other path including the fifth control device, the other supply line including a second of two parallel paths extending to the load with one path including the second, fourth, and sixth control devices in series and with the other path including the seventh control device; a bypass switching structure including interlock means between the fifth, sixth, and seventh control devices for preventing closing of more than one control device at a time and comprising first, second, and third levers between respective pairs of the fifth, sixth, and seventh control devices which levers are operatively connected respectively to the contact carriers of the corresponding fifth, sixth and seventh control devices.

The advantage of the device of this invention is that a closed circuit breaker must first be opened before another breaker can be closed. Moreover, it provides for isolation of certain of the control devices for maintenance purposes.

BRIEF DESCRIPTION OF THE DRAWINGS

FIG. 5 is a plan view of an interlock lever device operative with the bypass switch structure for interlocking the several switches in the desired mode of either FIGS. 1, 2, or 3;

FIG. 6 is an end view taken on the line VI—VI of FIG. 5; and

FIG. 7 is a side view of the structure shown in FIG. 5.

DESCRIPTION OF THE PREFERRED EMBODIMENT

Figure 1:
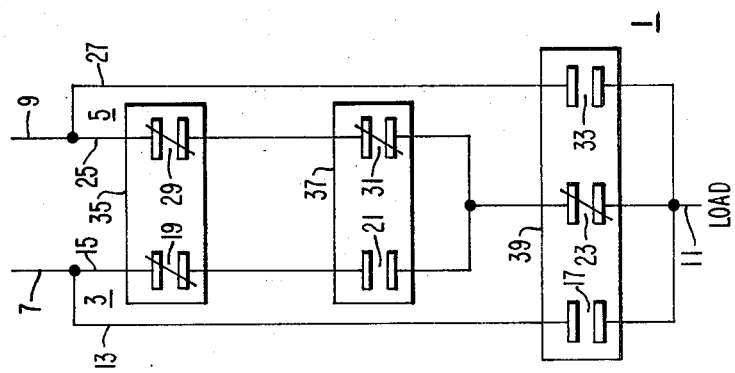
FIG. 1 is a circuit diagram of a switch structure having isolation and transfer switches with a bypass switch showing the switch structure in normal operating condition.

In FIG. 1 a switch structure, generally indicated at 1, comprises two parallel paths or circuits 3 and 5. The circuit 3 extends from one current supply or emergency line 7 and the parallel path 5 extends from another current supply or normal line 9. Both paths lead to a load 11. The parallel path 3 comprises circuits 13 and 15, the former of which includes a control device or circuit breaker 17. The circuit 15 includes control devices or circuit breakers 19, 21, and 23.

The parallel path 5 comprises circuits 25, 27, the former of which includes control devices or circuit breakers 29, 31, and 23. The circuit 27 includes a control device or circuit breaker 33.

Moreover, the switch structure 1 includes an isolate switch 35, a transfer switch 37, and a bypass switch 39. The isolate switch 35 includes the circuit breakers 19, 29, the transfer switch includes the circuit breakers 21, 31, and the bypass switch includes the circuit breakers 17, 23, 33. The circuit breakers 17, 19, 21, 23, 29, 31, 33 are a conventional type of circuit breaker such as, for example, that shown in FIG. 4 and described hereinbelow.

The purpose of the transfer switch 37 is to automatically switch power from one or normal line to the other or emergency line in the event of a power failure. The emergency power may be supplied from a generator (not shown). The isolate switch 35 and the bypass switch 39 permit maintenance to be performed safely on the transfer switch 37. The bypass switch 39 prevents the load 11 from being without power. Such redundant structure is becoming mandatory in hospitals and other critical facilities in the United States. The circuit breaker 23 is used 99% of the time. The other six circuit breakers enable functioning in a redundant mode possibly operating less than 1% of the time. The bypass switch 39 operates in a certain sequence or timing which prevents any two circuit breakers of the circuit breakers 17, 23, 33 from being on at any one time. However, in the event that either of the bypass breakers 17, 33 trips and has welded contacts, such as due to circuit overload, the handles of the circuit breakers 17, 23, 33 continue to operate.

Figure 2:
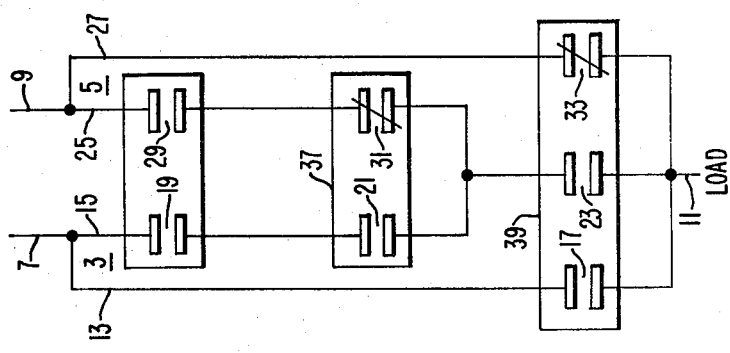
FIG. 2 is a circuit diagram similar to FIG. 1 showing the structure in the bypass normal condition.

The condition of the switch structure 1 in FIG. 1 shows the normal operating condition, whereby power is conducted from the normal line 9 through the circuit breakers 29, 31, 23 to the load 11. Where for some reason (FIG. 2) one of the circuit breakers, such as breakers 21 or 31 requires maintenance service, the circuit 27 including the circuit breaker 33 may be used, thereby circumventing the breakers 21 or 31. For that purpose isolate switch 35 including the breakers 19, 29 are opened to create safe working conditions at the circuit breakers 21 or 31.

Figure 3:
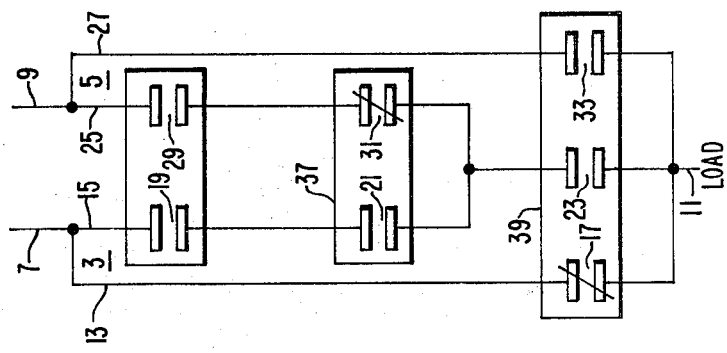
FIG. 3 is a circuit diagram similar to FIGS. 1 and 2 showing the switch structure in the bypass emergency condition.

As shown in FIG. 3 where the normal supply 9 is unavailable, the emergency supply 7 functions through the circuit 13 having the circuit breaker 17. In the alternative, emergency supply 7 moves through the circuit breakers 19, 21, 23. However, the bypass circuit 13 is shown in use to demonstrate that maintenance service may be performed at either or both the circuit breakers 21, 31 where necessary.

Figure 4:
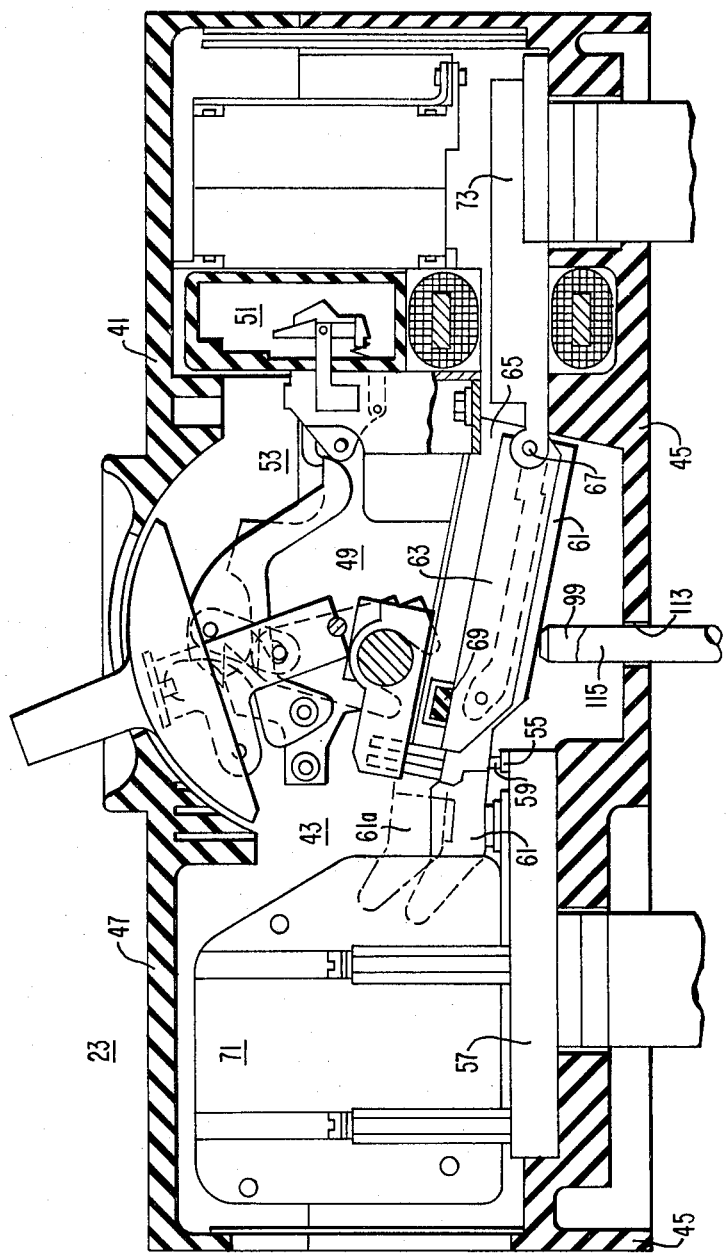
FIG. 4 is a sectional view, with parts broken away, of a circuit breaker construction in accordance with the principles of this invention.

The several circuit breakers 17-33 are preferably constructed as shown for example by a circuit breaker 23 in FIG. 4. The circuit breaker 23 comprises an insulating housing 41 and a circuit breaker mechanism 43 supported within the housing. The housing 43 comprises an insulating base 45 and an insulating cover 47. The circuit breaker 23 is similar to that disclosed in U.S. Pat. No. 3,821,607 which is incorporated by reference as part hereof. Because of the full disclosure in that patent, the description of the operating parts is limited herein to the basic structure and operation. The circuit breaker mechanism 43 comprises an operating mechanism 49, a latch and trip device 51, and a trip actuator 53.

The circuit breaker 23 is a three-pole device comprising three compartments disposed in a side-by-side relationship. The center pole compartment is separated from the two outer pole compartments by insulating barrier means formed with the housing base 45 and the cover 47. The operating mechanism 49 is disposed in the center pole compartment and is a single operating mechanism for actuating the contacts of all three pole units.

Each pole unit comprises a stationary contact 55 that is fixedly secured to a rigid main conductor 57. In each pole unit, a movable contact 59 is secured, such as by welding, to a contact arm 61 that is mounted on a switch arm 63. The assembly of the arms 61, 63 is pivotally supported at one end thereof on a support bracket 65 by a pivot pin 67. The switch arms 63 of all three pole units are connected to move in unison by a common insulating tie bar 69 that is rigidly connected to all three switch arms.

In each pole unit, an arc extinguishing unit or arc chute 71 is provided to extinquish the arcs drawn between the associated contacts 55, 59. When the contacts 55, 59 are closed, a circuit extends from the conductor 57 through the contacts 55, 59, the arm 63, and a conductor 73. When the circuit breaker is open, the contact arm 61 is raised to the broken line position 61a.

In accordance with this invention interlock means are provided in association with the bypass switch 39 and the circuit breakers 17, 23, 33. The interlock means, generally indicated at 75 (FIG. 5), comprises three levers 77, 79, 81 which are pivotally mounted on pins 83, 85, 87 respectively. The pins 83, 85, 87 are supported by supports 89, 91, 93. The supports 89, 91 are fixedly mounted on a wall or panel 95 and the support 93 is mounted on a bracket 97 which is likewise supported on the wall 95 (FIGS. 6, 7).

As shown in FIGS. 4, 5 means are provided at the ends of the several levers 77, 79, 81 for controlling opening and closing of the circuit breakers 17, 23, 33 which means include plungers 99, 101, 103 which are pivotally mounted on similar pins 105, 107, 109, respectively on the levers 77, 79. More specifically, the plunger 99 at one end of the lever 77 extends through aligned holes 111, 113 in the wall 95 and base 45 of the circuit breaker 17. The upper end (FIG. 4) of the plunger 99 contacts the underside of the switch arm 63 of the circuit breaker 17. Similarly, the plunger 101 at the opposite end of the lever 77 extends through the aligned holes in the wall 95 and the cover 45 to contact the underside of the contact arm 61 of the circuit breaker 23. The plunger 101 differs from the other plunger in that it is pivotally mounted by the pin 107 to adjacent ends of both plungers 77, 79.

The plunger 103 at the right end of the lever 79 (FIG. 5) likewise extends through aligned holes in the wall 95 and cover 45 to engage the contact arm 61 of the circuit breaker 33.

In a similar manner, the lever 81 is provided with plungers 115, 117 at opposite ends thereof where they are secured in place by similar pivot pins 106. The plunger 115 extends through the aligned holes in the wall 95 and cover 45 to contact the underside of the contact arm 61 of the circuit breaker 17 (FIG. 4). At the opposite end of the lever 81 the plunger 117 is similarly disposed with respect to the contact arm of the circuit breaker 33. The plungers 115, 117 only for the lever 81 go through the outermost phase of each of the outermost breakers.

In operation, when the circuit breaker 23 is closed (FIG. 1) in a normal operating condition, the contact arm 61 of that circuit breaker pushes out the plunger 101 (FIG. 5) and thereby pushes in the plungers 99, 103 inwardly against corresponding contact arm 61 of the circuit breaker 17, 33, thereby preventing the latter circuit breakers from being closed. Similarly, when the switch structure 1 is disposed in the condition of FIG. 2 in which the circuit breaker 33 in the bypass circuit 27 is closed, the contact arm 61 of the circuit breaker 33 pushes out both plungers 103, 117 and pushes in the plungers 115, 101 inwardly to prevent inadvertent closing of the circuit breakers 17, 23. Finally, when the emergency bypass circuit breaker 17 is closed (FIG. 3) the corresponding contact arm 61 for that circuit breaker pushes out both plungers 115, 99 (FIG. 4) to thereby push in the plunger 117 against the raised contact arm 61 of the circuit breaker 33 to prevent its inadvertent closing. At the same time the plunger 101 on the lever 77 is pushed in to prevent closing of the circuit breaker 23.

Accordingly, the interlock means 75 including the lever-plunger combination provides for the closing of only one circuit breaker 17, 23, 33 in the bypass switch 39 and thereby satisfies the safety requirement for operating personnel as well as associated circuits and equipment. The circuit breakers 19, 29 in the isolate switch 35 are preferably operated manually. The circuit breakers 21, 31 in the transfer switch 37 may be actuated automatically in response to a change between the normal line 9 and the emergency line 7.

In another embodiment of the invention, the circuit 13 including the circuit breaker 17 of the bypass switch 39 may be omitted for some purposes where desired.

Accordingly, the interlock means of this invention comprising the levers, or so-called "walking beams", prevent any two breakers in the bypass switch from closing at the same time and in the total interlock system of the bypass switch all breakers are interlocked in pairs to prevent any two breakers from being on at the same time.

What is claimed is:

1. An electric control system for switching between supply lines extending to a load, comprising an isolation switching structure, a transfer switching structure, and a bypass switching structure; the isolation switching structure including first and second control devices, the transfer switching structure including third and fourth control devices, the bypass switching structure including fifth, sixth and seventh control devices, all of the control devices having contact carriers operable between open and closed circuit conditions; an emergency supply line including a first of two parallel paths extending to a load with one path including the first, third, and sixth control devices in series and with the other path including the fifth control device; a normal supply line including a second of two parallel paths extending to the load with one path including the second, fourth, and sixth control devices in series and with the other path including the seventh control device; and the bypass switching structure including interlock means including levers between the fifth, sixth, and seventh control devices for preventing closing of two control devices when one is previously closed.

2. The system of claim 1 in which the interlock means comprises first, second and third levers between respective pairs of the fifth, sixth, and seventh control devices.

3. The system of claim 2 in which the first, second, and third levers are operatively connected respectively to the contact carriers of the corresponding fifth, sixth and seventh control devices.

4. The system of claim 3 in which each fifth, sixth and seventh control device comprises a movable contact carrier movable between open and closed circuit positions, the first lever being pivotally mounted between the movable contact carriers of the fifth and sixth control devices, the second lever being pivotally mounted between the movable contact carriers of the sixth and seventh control devices, and the third lever being pivotally mounted between the movable contact carriers of the fifth and seventh control device.

5. The system of claim 4 in which the each of the control devices comprises two outer and an inner phase contact carriers, and the first lever being operable between the contact carriers of the inner phases of the fifth and sixth control devices.

6. The system of claim 5 in which the second lever is operable between the contact carrier of the inner phases of the sixth and seventh control devices.

7. The system of claim 6 in which the third lever is operable between the contact carriers of the outermost phase of the fifth and seventh control devices.

* * * * *